Figure 1:
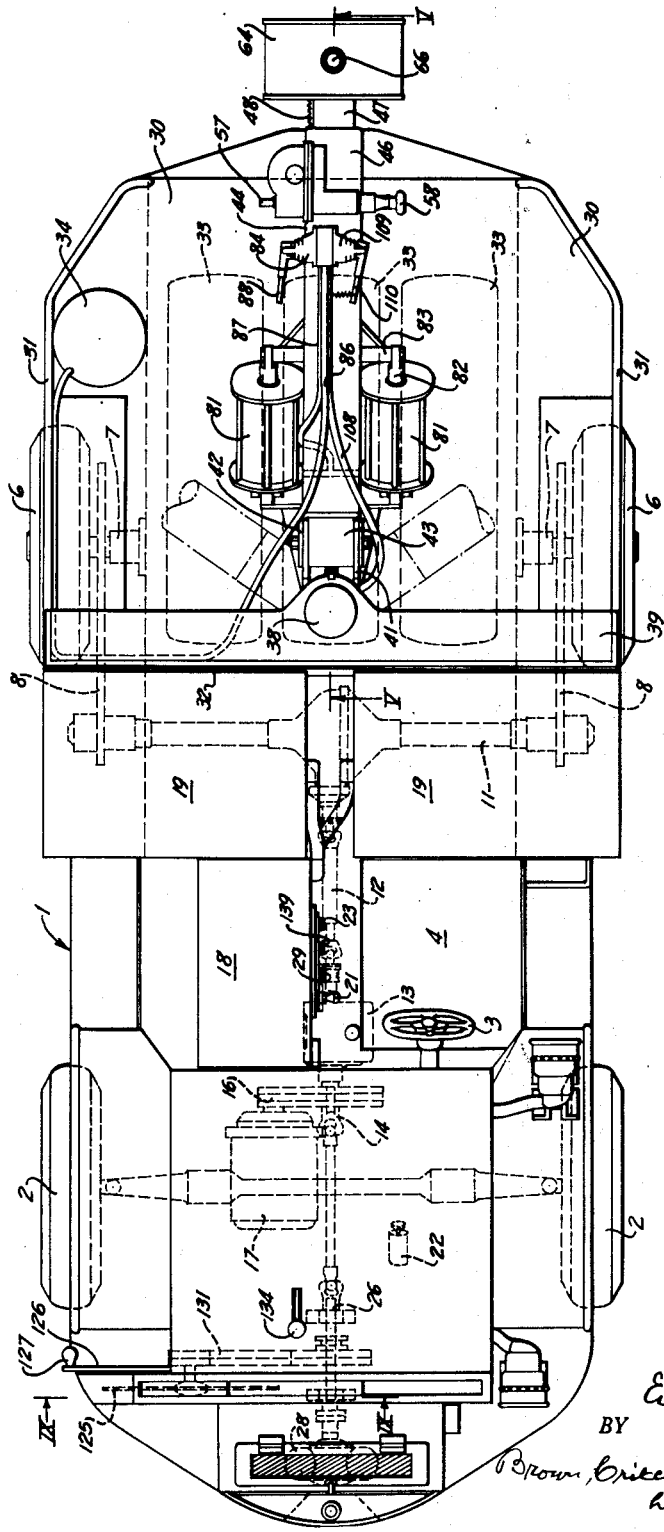

Dec. 29, 1953    E. M. ARENTZEN    2,664,217
MINE SERVICE VEHICLE
Filed Oct. 13, 1949    5 Sheets-Sheet 1

INVENTOR.
Einar M. Arentzen
BY
Brown, Critchlow, Flick & Peckham
his Attorneys

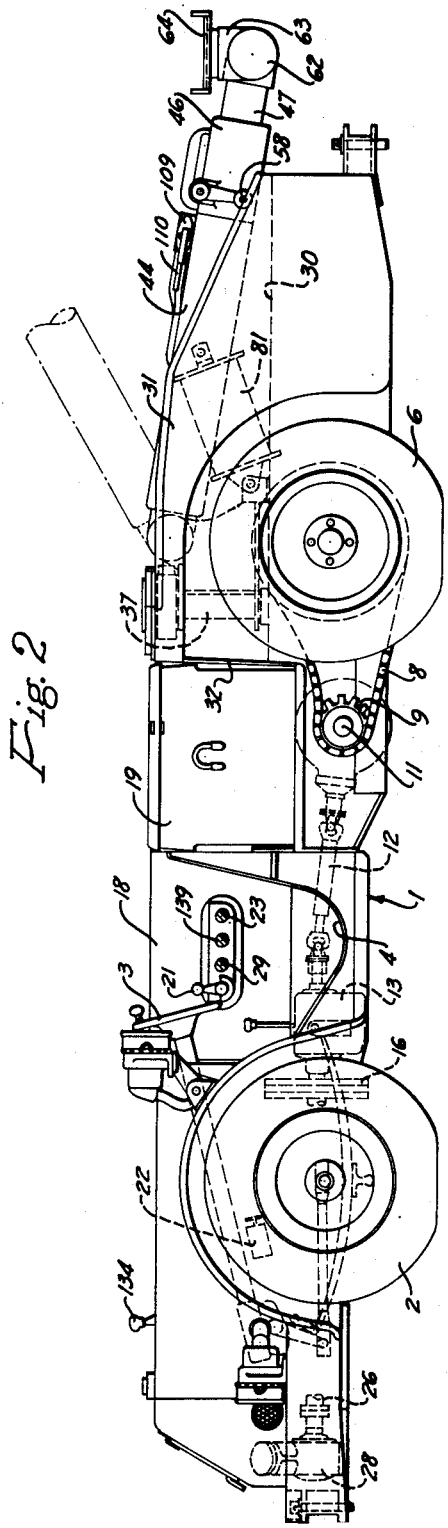

Dec. 29, 1953  E. M. ARENTZEN  2,664,217
MINE SERVICE VEHICLE
Filed Oct. 13, 1949  5 Sheets-Sheet 3
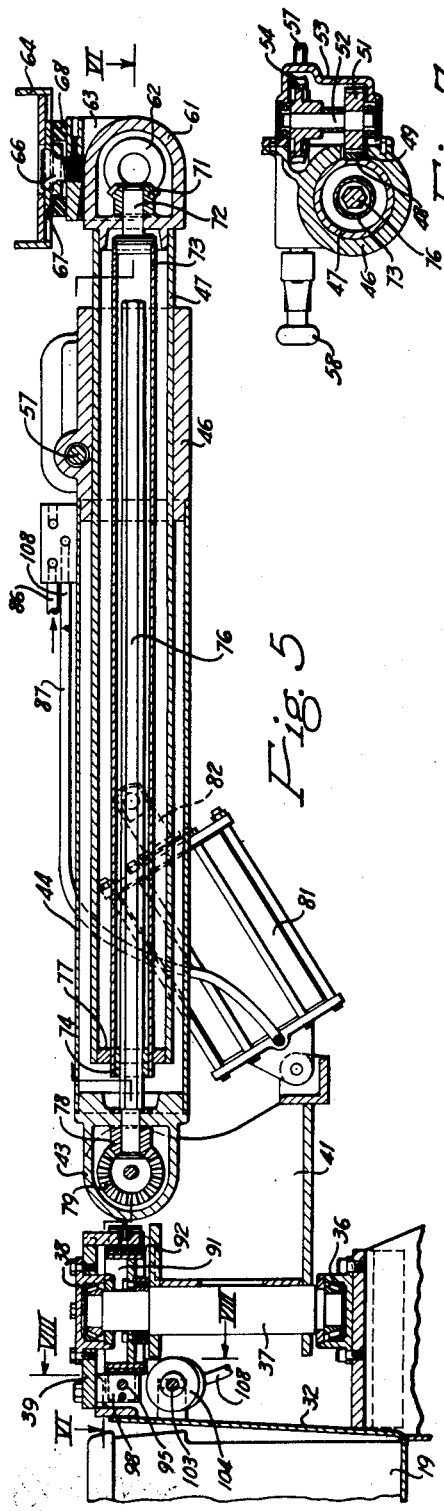
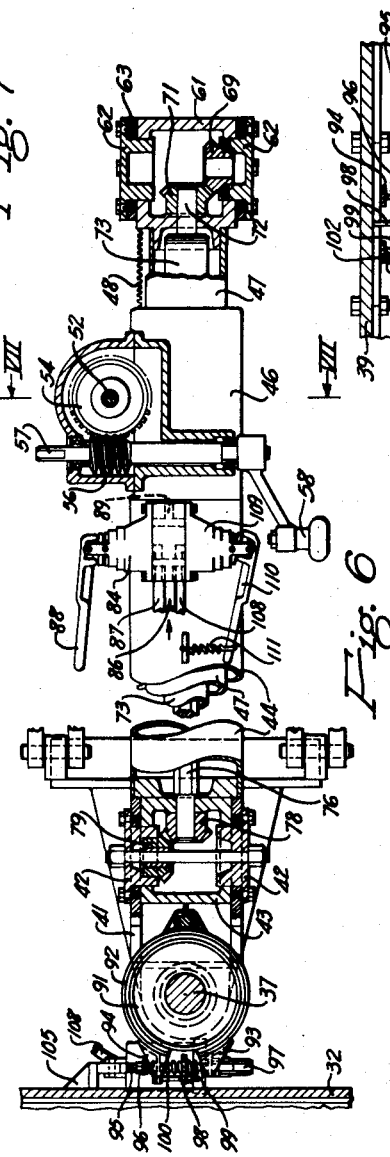
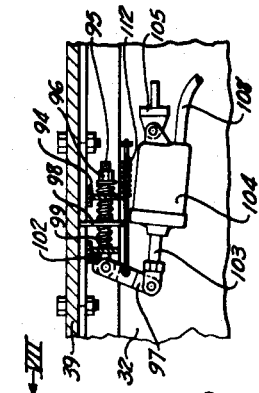
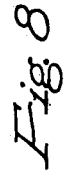
INVENTOR.
Einar M. Arentzen
BY
Brown, Critchlow, Flick & Peckham
his Attorney Dec. 29, 1953    E. M. ARENTZEN    2,664,217
MINE SERVICE VEHICLE
Filed Oct. 13, 1949    5 Sheets-Sheet 4

INVENTOR.
Einar M. Arentzen
BY Brown, Critchlow,
Flick & Peckham
his Attorneys.

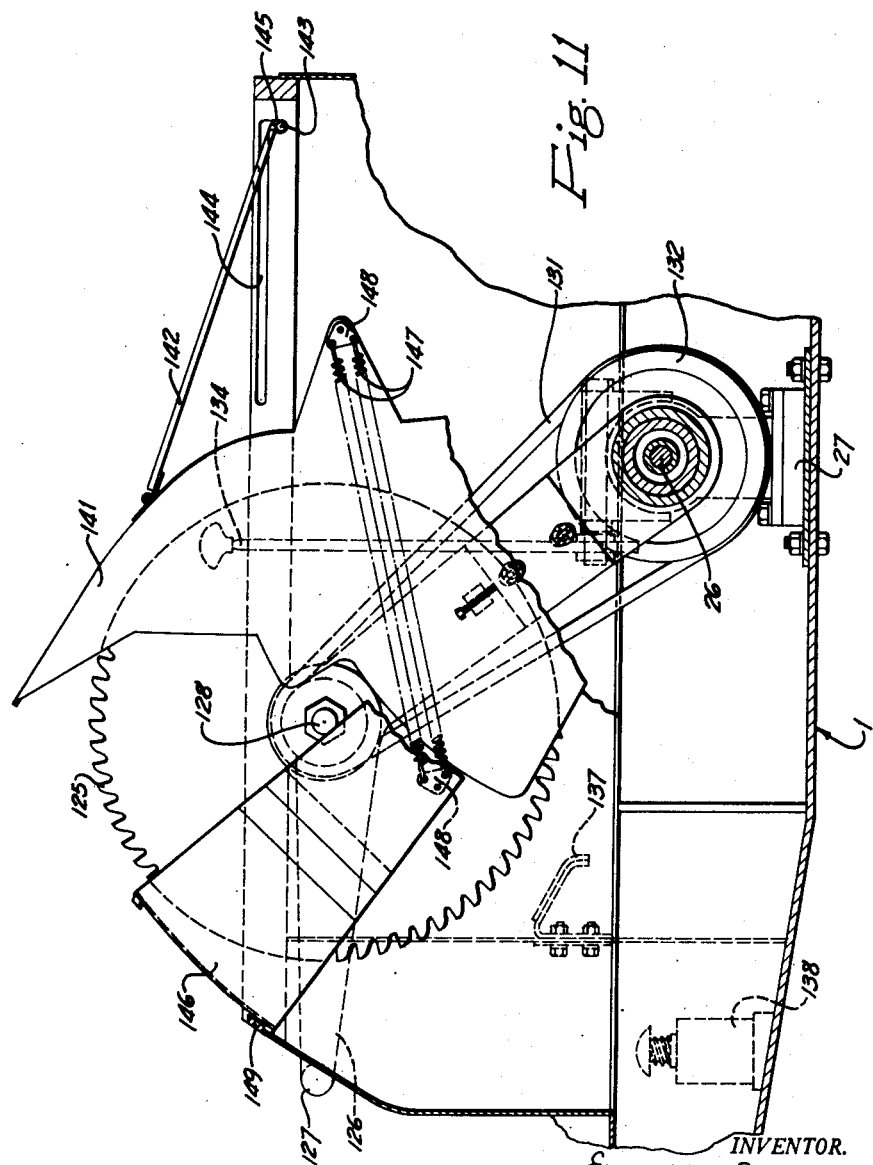

Patented Dec. 29, 1953

2,664,217

UNITED STATES PATENT OFFICE 2,664,217

MINE SERVICE VEHICLE

Einar M. Arentzen, Mount Lebanon, Pa., assignor to Lee-Norse Company, Charleroi, Pa., a corporation of Pennsylvania Application October 13, 1949, Serial No. 121,193

9 Claims. (Cl. 214—149)

This invention relates to mine vehicles, and more particularly to a self-propelled rubber tired vehicle designed to perform several different services in a mine.

It is among the objects of this invention to provide a mine vehicle of the character just mentioned which is powerful but of small size and easy to manipulate in a mine, which can supply air and lubrication and hydraulic oil under pressure to other vehicles and mining machinery, which can set timbers overhead in mine workings, which can saw mine timbers to desired lengths, and which performs all of these operations by means of power produced by a single electric motor.

In accordance with this invention, a mine vehicle has wheels which are driven by an electric motor. The motor may obtain its electric current from batteries carried by the vehicle or through a cable reel from a remote stationary source of power. The motor also drives a shaft which operates an air compressor. This compressor furnishes compressed air to a number of service tanks mounted in the back portion of the vehicle. These tanks may contain several different materials such as transmission lubricant, pressure gun grease, hydraulic oil, and compressed air only. The tanks are provided with suitable outlets having connections for delivering their contents to other vehicles and mining machinery. The vehicle thus becomes a service station on wheels.

Mounted on the rear portion of the vehicle is a telescoping boom that can be swung vertically and laterally. A timber support is mounted on a horizontal axis on the outer end of the boom. The boom includes means for holding the timber support horizontal as it is elevated by the boom. Elevation of the boom can be accomplished by air compressed by the compressor.

Rotatably mounted on the shaft that drives the compressor is one end of an arm. A vertical circular saw is rotatably mounted on the arm at one side of the shaft, by which it is driven through a clutch. An electric switch for the motor normally is held open by weight of the arm resting on it, but it is adapted to close and start the motor under certain conditions when the arm is raised. The saw is covered by a housing that is provided with a slot in its top for the saw to project through when the outer end of the arm is raised, so that a mine timber on top of the housing can be sawed. A guard normally extends over the saw and is mounted so that it can be swung up away from the saw to uncover it before the saw is raised.

Figure 10:
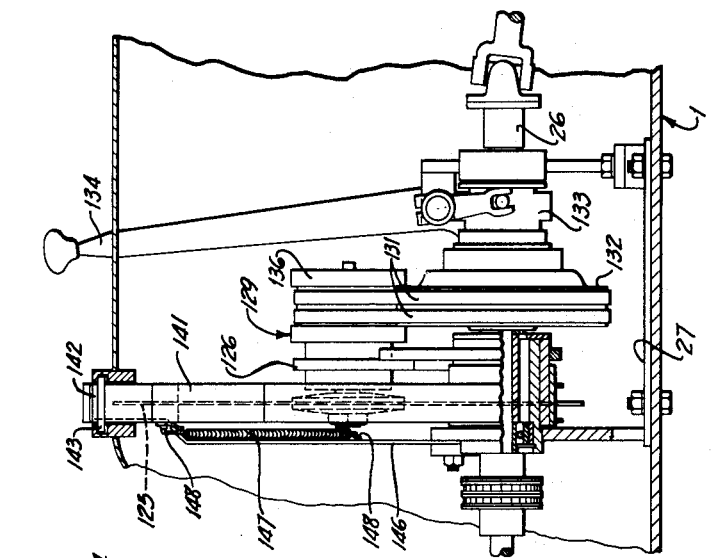
Figure 9:
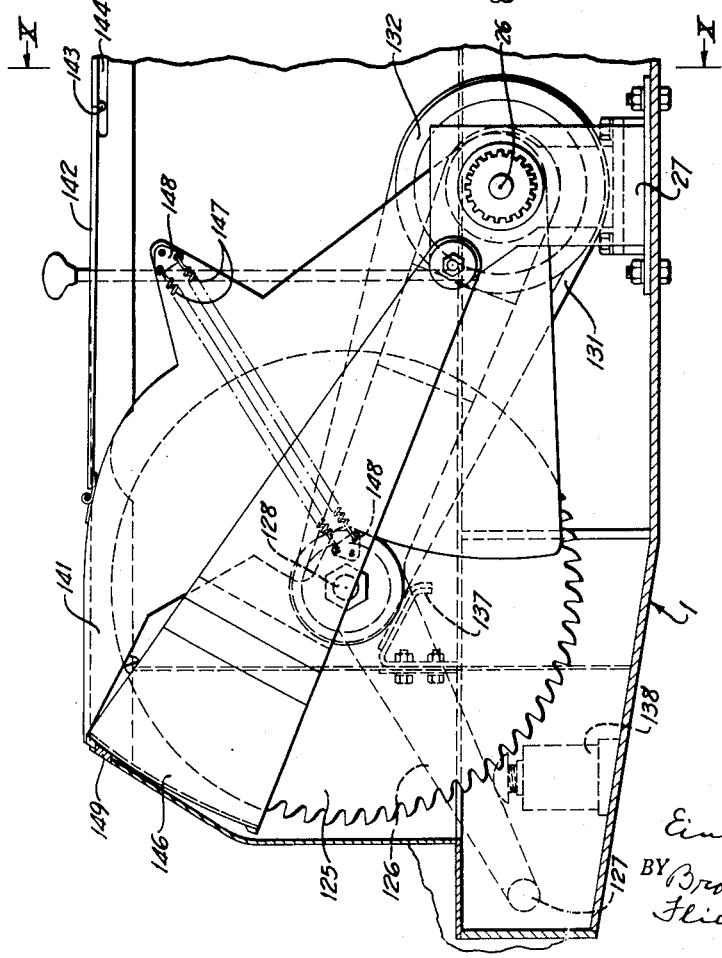

The preferred embodiment of the invention is illustrated in the accompanying drawings, in which Fig. 1 is a plan view of my mine vehicle; Fig. 2 is a side view thereof; Figs. 3 and 4 are front and rear end views, respectively, of my vehicle; Fig. 5 is an enlarged fragmentary vertical section taken on the line V—V of Fig. 1; Fig. 6 is a fragmentary horizontal section, with parts of the boom in elevation, taken on the line VI—VI of Fig. 5; Fig. 7 is a vertical section of the boom taken on the line VII—VII of Fig. 6; Fig. 8 is a fragmentary vertical section taken on the line VIII—VIII of Fig. 5; Fig. 9 is an enlarged vertical section through the front end of the vehicle, taken on the line IX—IX of Fig. 1; Fig. 10 is a vertical section taken on the line X—X of Fig. 9; and Fig. 11 is a view similar to Fig. 9, but with the saw raised into operative position.

Referring to Figs. 1 to 4 of the drawings, the body 1 of the vehicle is supported at its front end by rubber tired wheels 2 that can be steered by a steering wheel 3 controlled by an operator seated behind the wheel. The entire vehicle is very low so that it can travel through low mine passages, and the seat 4 for the operator is placed low in the body so that his head will not extend very far above the top of the vehicle. The rear part of the vehicle body is supported by rubber tired wheels 6 mounted on stub axles 7 secured to the body. These two wheels are driven by chains 8 and sprockets 9 from the ends of a rear axle 11 supported by the body in front of the wheels. The axle is driven through a propeller shaft 12 from a transmission 13 that preferably has four speeds ahead. The transmission drive shaft 14 is driven through a belt and pulley drive 16 by an electric motor 17 mounted under the hood of the vehicle. This motor obtains its electric current through a controller 18 from storage batteries carried in boxes 19 behind the driver. Mounted on the driver's side of the controller are four electric switches. When the lever 21 that operates the front switch is straight up the motor is turned off, but when the lever is swung forward the motor rotates in a direction to drive the vehicle ahead. When the lever is pulled back the motor is operated in the reverse direction. Thus, the direction of travel of the vehicle is determined by the position of this lever. The electric circuit to the motor is not completed, however, unless a normally open dead-man switch 22 is kept closed by the pressure of one foot of the operator. The rear switch 23 controls the lights on the vehicle.

Also driven by the front end of transmission shaft 14 is a compressor shaft 26 that is rotatably mounted in the opposite ends of a bracket 27 supported in the front end of the vehicle, as shown in Figs. 9 and 10. Coupled to the front end of this shaft is an air compressor 28. Although this compressor is driven all of the time that motor 17 is operating, it is the well-known type which includes a by-pass that opens when a maximum air pressure is reached. When the vehicle is standing still with lever 21 in neutral position, which would shut off the motor, the motor can be operated by closing a "compressor" switch 29 on the controller. The compressor pumps air into several tanks mounted in the rear end of the vehicle.

Preferably, the back part of the vehicle has a floor 30 from which walls 31 and 32 extend upward. In a compartment beneath the floor there are several parallel service tanks 33. When three tanks are used, one of them may contain transmission lubricant, one may contain hydraulic oil for hydraulically operated cylinders, and the remaining tank may contain grease such as is used in pressure guns for lubricating vehicles and machinery. At one side of these tanks there may be a short vertical tank 34 that contains only compressed air for inflating tires. Other tanks can be added if required. The various tanks are provided with outlets (not shown) that have suitable connections for delivering their contents, which are forced out by the air pressure in the tanks, to the desired locations.

Mounted on the front end of floor 30 is a bearing 36, in which the lower end of a vertical post 37 is rotatably mounted, as shown in Figs. 5 and 6. The upper end of the post is mounted similarly in a bearing 38 supported by a horizontal plate 39 extending across the top of the vehicle body along the upper edge of transverse wall 32. Rigidly mounted on the post is a bracket 41 which has parallel vertical side walls, in the upper portions of which a pair of axially aligned bearing members 42 are rigidly mounted. These members project toward each other between the bracket walls. Pivotally mounted on the inner ends of these bearing members is a hollow support 43 that supports the inner or front end of a long cylinder 44 which extends back and overhangs the rear end of the vehicle body. The rear or outer end of this cylinder supports the front end of a tubular member 46 in which a second cylinder 47 is slidably mounted. This smaller cylinder projects from both ends of the tubular member and can be moved lengthwise therein in telescoping relation with the other cylinder 44, whereby a telescoping boom is formed by which overhead timbers can be lifted into place and held there while they are propped up.

To extend and contract the boom, one side of the smaller cylinder is provided with a rack 48 extending lengthwise of it through a slot 49 in one side of tubular member 46, as shown in Fig. 7. The rack teeth are engaged by a gear 51 mounted on the lower end of a vertical shaft 52 journaled in a gear box 53 attached to one side of the tubular member. The upper end of this shaft carries a worm gear 54 that can be turned by a worm 56 mounted on a horizontal shaft 57 extending across the top of the tubular member and projecting from its opposite sides. A removable crank 58 can be mounted on either end of this shaft to turn it.

Rigidly mounted in the outer end of the smaller cylinder 47 is a hollow housing 61 having axially aligned bearing members 62 rotatably mounted in its opposite sides. The outer ends of these bearing members support an inverted U-shaped bracket 63, on which a timber-supporting channel-like turntable 64 is rotatably mounted by means of a central screw 66 having a head with a spherical bearing surface. The bottom of the turntable rests on a metal ring 67 secured to the top of a rubber ring 68 attached to the top of the bracket. The friction between the turntable and the metal ring prevents the turntable from turning of its own accord, and the rubber ring permits tilting of the table in any direction under pressure from above. The turntable otherwise always is maintained horizontal by a bevel gear 69 fastened in one of the bearing members 62 and meshing with another bevel gear 71 secured to the end of a stub shaft 72 rotatably mounted in the inner end of housing 61. The opposite end of this stub shaft is secured in the outer end of a long tube 73, the opposite end of which contains a noncircular bushing 74 that is slidable along a correspondingly shaped shaft 76 inside the tube. The inner end of the tube is rotatably mounted in a bushing 77 secured in the inner end of the inner cylinder 47. The cylindrical inner end of shaft 76 is rotatably mounted in the outer end of cylinder support 43 and carries a bevel gear 78 that meshes with a stationary bevel gear 79 rigidly mounted in one of the bearing members 42. With this arrangement, if the boom is swung upward as indicated in broken lines in Fig. 2, the gear 78 on the inner end of the long shaft 76 will rotate against the stationary gear 79 engaging it and will thereby rotate the shaft and encircling tube 73. This will rotate the gear 71 at the outer end of the tube, which in turn will rotate the gear 69 engaging it and thus maintain the upper wall of bracket 63 horizontal. Consequently, the turntable 64 will remain horizontal at all times.

In order to raise the boom, a pair of fluid pressure cylinders 81 have their lower ends pivotally connected on a horizontal axis to the lower part of bracket 41. In each lifting cylinder there is a piston, from which a piston rod 82 extends out of the upper end of the cylinder. The outer ends of the piston rods are pivotally connected to brackets 83 (Fig. 1) on opposite sides of the large boom cylinder 44. Air pressure delivered to the lower ends of the lifting cylinders will force the piston rods upward and outward and thereby swing the boom upward. When the pressure is released, the boom will settle back to its lower position by gravity. To control the admission of air to the lifting cylinders and its release therefrom, a manually operated three-way valve 84 may be mounted on the boom in a position where it can be reached by an operator standing behind the vehicle. The inlet of this normally closed valve is connected by a hose 86 to the top of the tank 34 to receive air pressure therefrom. The valve is connected by a hose 87 to the lower ends of the lifting cylinders for delivering air under pressure thereto when a control lever 88 is swung in one direction. When the valve lever is swung in the opposite direction it connects hose 87 with the atmosphere through an exhaust port 89 to exhaust the cylinders. When the hand is taken from the valve lever it swings back into neutral position to prevent flow of air either into or out of the cylinders.

In case the electric motor 17 receives its power from a remote stationary generator through a cable, instead of from batteries carried by the vehicle itself, a hydraulic pump may be mounted on the vehicle in place of the batteries, and some of the hydraulic pressure from that pump can be used for raising the boom. In such a case, smaller lifting cylinders can be used.

The boom can be swung laterally around the vertical post 37 to the positions indicated in broken lines in Fig. 1 by merely pushing the boom, but it is desirable to provide a brake for holding the boom in any position to which it has been swung. Accordingly, a brake drum 91 is rigidly mounted on the upper portion of the post and is encircled by a flexible brake band 92. The ends of the band are spaced apart and are secured to metal brackets 93 and 94 slidably mounted on a short horizontal rod 95. A nut 96 is screwed on one end of the rod and a lever 97 (Fig. 8) is pivotally mounted on the opposite end of the rod. The central portion of the rod extends slidably through a vertical plate 98 secured to the horizontal plate 39 above it. Coil springs 99 are mounted on the rod between the vertical plate and the two brackets 93 and 94. Bracket 94 is connected by a bolt 100 (Fig. 6) with the vertical plate for centering the band relative to the rod.

As shown in Fig. 8, the upper end of lever 97 has a projection that bears against a block 102 connected to the adjoining end of brake band bracket 93. The lower end of the lever is pivotally connected to the outer end of a piston rod 103 that extends into a fluid pressure cylinder 104 pivotally connected on a horizontal axis to a bracket 105 fastened to transverse wall 32 of the vehicle body. Air under pressure delivered to the bracket end of the cylinder will move the piston rod outwardly in the cylinder and thereby swing the lower end of the lever away from the cylinder. As the lever is pivotally mounted on the adjoining end of rod 95, the lever projection, bearing against block 102, will force bracket 93 toward the vertical plate 98. At the same time, the lever will pull on the rod so that the other brake band bracket 94 also will be moved toward the vertical plate. When the two ends of the brake band are moved toward each other in this way, the band is tightened around the drum and the brake is set.

The air pressure is delivered to the brake cylinder through a hose 108 connected to a three-way valve 109 that may be mounted on the boom beside valve 84. The inlet of valve 109 receives air under pressure from hose 86, and it exhausts through outlet port 89. The valve includes a lever 110 that normally is swung into one position by a coil spring 111 so that air pressure normally will be delivered to the brake cylinder. This means that the brake is always set unless the valve lever is swung manually in the opposite direction to connect hose 108 with port 89 to release air pressure from the brake cylinder. To help release the brake when the cylinder is exhausted, a coil spring 112 (Fig. 8) may be connected to the brake lever 97 and to wall 32 of the vehicle body to pull the lower end of the lever back toward the cylinder.

It often is necessary to cut the timbers that are to be lifted by the timber setting boom so that they will fit properly in place. Therefore, it is a great convenience to equip this vehicle with a power saw for that purpose as well as for cutting mine props. As best shown in Figs. 9 to 11, the vertical circular saw 125 is mounted in the front end of the vehicle body at one side of the compressor shaft 26, from which it is driven. To support the saw, an arm 126 has its inner end pivotally mounted on the compressor shaft and has its outer end extending out through a vertical slot in one side of the hood. The outer end of the arm is provided with a handle 127 for lifting it. Rotatably mounted in the central portion of the arm is a short shaft 128, on the front end of which the saw is rigidly mounted. The other end of the shaft carries a pulley 129 that is driven by belts 131 from another pulley 132 rotatably mounted on the compressor shaft. Behind this pulley there is a clutch 133, operated by an upright hand lever 134 extending through a slot in the top of the hood, for coupling the shaft to the pulley so that the saw can be driven. The saw pulley 129 has a side flange 136 that is adapted to rest on a stop 137 inside the hood to support the arm in its lower position. Engagement of the pulley flange with this stop also prevents the saw from being slowly turned by the pulley drive while the clutch is thrown out.

In its lower position the outer end portion of saw arm 126 depresses an electric switch 138 which thereby opens an electric circuit connected in series with a "saw" switch 139 on the controller that the operator closes when he wishes to operate the saw. However, motor 17 will not operate until the saw arm is lifted far enough for the spring-actuated depressed switch 138 to close. Even then, clutch 133 has to be engaged before the saw will operate.

In its lower position the saw is beneath the top of the hood, but the hood is provided with a horizontal transverse slot through which a portion of the saw can be raised for cutting timbers resting on the hood. To protect the saw when it is not being used, a guard 141 with depending side walls straddles the upper portion of the saw and extends down and laterally to the compressor shaft 26, on which it is pivotally mounted so that it can be swung up and down. The upper part of this guard normally closes the end of the slot above the saw, and a bar 142 is pivotally connected to the guard and extends back along the slot a considerable distance. The free end of the bar carries a cross pin 143 that slides in parallel grooves 144 as the guard is swung upward. The outer ends of the grooves have downward extensions 145 into which the pin drops to hold the guard in its raised position, as shown in Fig. 11. When raised, the guard also forms a backstop for timbers being sawed.

To help protect the operator while he is using the saw, a lower saw guard 146 is provided which has an outer portion that straddles part of the saw. The inner end of this guard is pivotally connected to the main bracket 27 so that the guard can swing up and down. The two guards are connected together by a pair of coil springs 147 fastened to brackets 148 pivotally connected to them. Consequently, when the upper guard is raised, the springs pull the lower guard up with it, until the lower guard strikes a stop 149. The lower guard rises above the saw slot far enough to give considerable protection to the operator standing beside the vehicle.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In a mine vehicle, a vertical post, a bracket mounted on the post and rotatable relative to the vehicle on a vertical axis, a telescoping boom extending laterally away from the bracket, means pivotally connecting the larger end of the boom to the bracket on a horizontal axis, a timber support pivotally mounted on a horizontal axis on the outer end of the boom, extensible means pivotally connected at its ends to the bracket and boom on horizontal axes for swinging the boom upward, means for extending the telescoping boom lengthwise, and means for holding said timber support horizontal as it is elevated by the boom to set a timber overhead in a mine, said last-mentioned means being extensible with the boom to hold the timber support horizontal regardless of the length of the boom.

2. In a mine vehicle, a vertical post rotatably mounted thereon, a bracket rigidly mounted on the post, a pair of telescoping boom members extending laterally away from the bracket, means pivotally connecting the inner end of the larger diameter boom member to the bracket on a horizontal axis, a timber support mounted on the outer end of the other boom member, a fluid pressure cylinder pivotally connected at one end to the bracket on a horizontal axis, a piston rod projecting from the opposite end of the cylinder and pivotally connected to said larger member on a horizontal axis for swinging said boom members upward, means for extending the telescoping boom members, and means including telescoping members extending through the boom members for holding said timber support horizontal as it is elevated to set a timber overhead in a mine.

3. In a mine vehicle, a vertical post rotatably mounted thereon, a bracket rigidly mounted on the post, a telescoping tubular boom extending laterally away from the bracket, means pivotally connecting the larger end of the boom to the bracket on a horizontal axis, a timber support pivotally mounted on a horizontal axis on the outer end of the boom, extensible means pivotally connected at its ends to the bracket and the boom on horizontal axes for swinging the boom upward, means for extending the telescoping boom lengthwise, a telescoping shaft journaled in the boom, gears rigidly mounted on the ends of said shaft, and gears meshing with said first-mentioned gears and rigidly connected with said bracket and timber support, whereby when the boom is raised to set a timber overhead in a mine said shaft will be rotated by the lower gears and the timber support will be maintained horizontal by the upper gears.

4. A machine for setting timbers overhead in mine workings, comprising a vehicle, a vertical post rotatably mounted thereon, a bracket rigidly mounted on the post, a pair of telescoping cylinders extending laterally away from the bracket, means pivotally connecting the inner end of the larger diameter cylinder to the bracket on a horizontal axis, a timber support mounted on the outer end of the other cylinder, a pair of fluid pressure cylinders pivotally connected at one end to the bracket on a horizontal axis, piston rods projecting from the opposite end of the hydraulic cylinders and pivotally connected to opposite sides of said larger cylinder on a horizontal axis for swinging the telescoping cylinders upward, a rack extending lengthwise of said other cylinder, a gear meshing with the rack and rotatably supported by said larger cylinder, means for rotating said gear for moving said timber support away from the post, a telescoping shaft journaled in said telescoping cylinders, bevel gears rigidly mounted on the ends of said shaft, and bevel gears meshing with said first-mentioned bevel gears and rigidly connected with said bracket and timber support, whereby when said piston rods swing the telescoping cylinders upward to set a timber overhead in a mine said shaft is rotated by the lower bevel gears and the timber support is maintained horizontal by the upper bevel gears.

5. In a mine vehicle, a vertical post rotatably mounted thereon, a brake normally holding the post against rotation, manually controlled means for releasing the brake, a bracket rigidly mounted on the post, a telescoping boom extending laterally away from the bracket, means pivotally connecting one end of the boom to the bracket on a horizontal axis, a timber support pivotally mounted on a horizontal axis on the other end of the boom, extensible means pivotally connected at its ends to the bracket and the boom on horizontal axes for swinging the boom upward, means for extending the telescoping boom lengthwise, and means including rotatable telescoping members inside said boom for holding said timber support horizontal as it is elevated by the boom to set a timber overhead in a mine.

6. In a mine vehicle, a motor for driving the vehicle, an air compressor also driven by the motor, a tank for receiving compressed air from the compressor, a rotatable vertical post, a brake for the post, an air pressure device normally connected with said tank and operably connected to the brake for setting it, a manually operable valve for releasing air pressure from said device to release the brake, a bracket rigidly mounted on the post, a pair of telescoping boom members extending laterally away from the bracket, means pivotally connecting the inner end of the larger diameter boom member to the bracket on a horizontal axis, a timber support mounted on the outer end of the other boom member, a fluid pressure cylinder pivotally connected at one end to the bracket on a horizontal axis, a piston rod projecting from the opposite end of the cylinder and pivotally connected to said larger member on a horizontal axis, the lower end of said cylinder being connected with said tank for receiving air pressure therefrom to force the piston rod outwardly in the cylinder for swinging said boom members upward, manually operable valve means controlling the admission of air to and its release from said cylinder, means for extending the telescoping boom members, and means for holding said timber support horizontal as it is elevated.

7. In a mine vehicle, a vertical post rotatably mounted thereon, a bracket rigidly mounted on the post, a pair of telescoping boom members extending laterally away from the bracket, means pivotally connecting the inner end of the larger diameter boom member to the bracket on a horizontal axis, a timber support mounted on the outer end of the other boom member, extensible means pivotally connected at its ends to the bracket and said larger member on horizontal axes for swinging said boom members upward, means for extending the telescoping boom members, and means including telescoping members extending lengthwise through the boom members for holding said timber support horizontal as it is elevated to set a timber overhead in a mine, said last-mentioned telescoping members being slid lengthwise on each other by the boom as it is lengthened and shortened.

8. In a mine vehicle, a bracket supported thereby, a pair of telescoping boom members extending laterally away from the bracket, means pivotally connecting the inner end of the larger diameter boom member to the bracket on a horizontal axis, a timber support mounted on the outer end of the other boom member, extensible means pivotally connected at its ends to the bracket and said larger member on horizontal axes for swinging said boom members upward, means for extending the telescoping boom members, and means including telescoping members extending lengthwise through the boom members for holding said timber support horizontal as it is elevated to set a timber overhead in a mine, said last-mentioned telescoping members being slid lengthwise on each other by the boom as it is lengthened and shortened.

9. In a mine vehicle, a bracket supported thereby, a pair of telescoping boom members extending laterally away from the bracket, means pivotally connecting the inner end of one of the boom members to the bracket on a horizontal axis, a timber support mounted on the outer end of the other boom member, means for swinging said boom members upward, means for extending the telescoping boom members, and means for holding said timber support horizontal as it is swung upward by the boom to set a timber overhead in a mine, said last-mentioned means including rotatable telescoping members extending lengthwise of the boom to maintain the timber support horizontal as the boom is extended.

EINAR M. ARENTZEN.

References Cited in the file of this patent

UNITED STATES PATENTS

| Number | Name | Date |
|---|---|---|
| 1,288,844 | Currivan | Dec. 24, 1918 |
| 1,364,356 | De Koning | Jan. 4, 1921 |
| 1,440,400 | Manierre | Jan. 2, 1923 |
| 1,603,573 | Baker | Oct. 19, 1926 |
| 1,755,738 | Klepadlo et al. | Apr. 22, 1930 |
| 2,099,998 | Berg | Nov. 23, 1937 |
| 2,377,279 | Stewart | May 29, 1945 |
| 2,397,271 | Ladwig | Mar. 26, 1946 |
| 2,408,387 | Gay et al. | Oct. 1, 1946 |
| 2,462,926 | Wilson et al. | Mar. 1, 1949 |
| 2,475,963 | Howell | July 12, 1949 |
| 2,505,958 | Grierson | May 2, 1950 |
| 2,532,079 | Beltz | Nov. 28, 1950 |
| 2,538,505 | Carter | Jan. 16, 1951 |
| 2,570,383 | Russell | Oct. 9, 1951 |
| 2,597,086 | Morrow | May 20, 1952 |
| 2,606,078 | Brock | Aug. 5, 1952 |
| 2,648,444 | Fitzgerald | Aug. 11, 1953 |

FOREIGN PATENTS

| Number | Country | Date |
|---|---|---|
| 391,777 | Great Britain | Apr. 26, 1933 |